United States Patent Office 3,087,864
Patented Apr. 30, 1963

3,087,864
PROCESS FOR THE 1,2-HYDROGENATION OF STEROIDS BY THE USE OF DRIED THALLI
Louis I. Feldman, Spring Valley, and Chester E. Holmlund, Pearl River, N.Y., and Norma L. Barbacci, Montvale, N.J., assignors to American Cyanamid Company, New York, N.Y., a corporation of Maine
No Drawing. Filed Apr. 28, 1961, Ser. No. 106,150
19 Claims. (Cl. 195—51)

This invention relates to a new method of biologically dehydrogenating steroids. More particularly, it relates to the 1,2-dehydrogenation of steroids by a new process.

In the past it has been mentioned that preparations other than growing cells could be used for steroid transformations, however, transformations in the literature are almost invariably carried out using growing cells. The outstanding utility of preparations used for steroid transformations which are free of growing cells has not been demonstrated.

The new process of the present invention comprises preparing and using a dry powder for the various reactions, such as, dehydrogenation of steroids, which is prepared by harvesting microorganisms, separating the supernatant liquid by filtration or centrifugation, precipitating the thalli in acetone and filtering the acetone treated thalli followed by air drying at room temperature or alternatively lyophilizing the thalli after separation from the supernatant beer, and washing. The term "thalli" is used to describe the cell body obtained after, for example, centrifugation and also includes mycelia. The thalli powder so prepared has shown remarkable activity for more than a year and, furthermore, after exposure to the steroid desired to be dehydrogenated may be reused in one or more consecutive new transformations. It also appears that identical thalli preparations may be dried and reused over a series of experiments to give consistently high yields of desired steroid and to obtain a high degree of standardization.

In carrying out the preparation of the dried thalli, a 1,2-dehydrogenating organism is grown under normal fermentation conditions, and harvested after good growth is achieved, usually within a period of 8 to 72 hours depending upon the organism and growing conditions. The thalli are then separated from the supernatant beer by filtration or centrifugation and may or may not be washed to remove extraneous material. The liquid remaining is removed by freeze dry lyophilization or mixing the thalli with acetone, removing the acetone and air drying. The dried thalli which is in the form of a powder can be stored at room temperature or preferably at about 4° C. These preparations of thalli have been shown to be active for more than a year and may retain their activity indefinitely.

In preparing the dried thalli of the present invention, we can use microorganisms of the class Schizomycetes, order Eubacteriales, family Corynebacteriaceae, genus Corynebacterium such as *Corynebacterium simplex*. Also microorganisms of the family Mycobacteriaceae such as *Mycobacterium phlei* and of the family Actinomycetaceae such as *Nocardia aurantia* and *Nocardia corallina*. We can use members of the Bacteriaceae family, such as *Bacterium cyclooxydans* and microorganisms of the order Pseudomonadales, family Pseudomonadaceae such as *Pseudomonas testosteroni*, members of the Ascomycetes class such as *Didymella lycopersici* and Fungi Imperfecti such as *Septomyxa affinis* can also be used.

The dried thalli are used to carry out a 1,2-dehydrogenation of steroids by mixing with water or a buffer solution such as, for example, 0.05 M Tris [tris-(hydroxylmethyl-aminomethane] pH 7.6, 0.05 M phosphate buffer pH 7.3. While a pH range of 5 to 10 is usually permissible, a pH range of from 6 to 8 has been found ideal. The desired steroid is added and after completion of the 1,2-dehydrogenation, the reaction mixture is extracted with the usual water immiscible steroid extracting solvents. Purification is carried out employing the usual purification techniques well known to those skilled in the art. The desired 1,2-dehydrogenated steroid is obtained by direct crystallization or, in some cases, chromatography can be used to advantage.

The use of dried thalli to carry out the reaction which is divorced from the growth phase of the organism has many advantages. The enzymatic reaction is the desired objective, and the growing of the organism which is the source of many undesirable features such as variability, high dilution, extraneous material, necessity of sterilization and asepsis is eliminated, numerous advantages are shown by the dry thalli preparations. One of the principal advantages is a standard source of enzyme from which standard 1,2-dehydrogenation conditions can be derived providing a higher degree of control and predictability than can be obtained with growing cells. A further advantage of the dry thalli preparation is the use of higher steroid concentrations in the transformation reaction thus reducing to a minimum the unfortunate dilution factor inherent in using growing cells for fermentation. A still further advantage of the dry thalli is that it permits through the removal of extraneous mash material higher isolation yields, simpler isolation procedures and a more accurate assay of the desired final product. Also, use of the dried thalli is advantageous as a time-saving factor since the absence of a growth phase at the time of 1,2-dehydrogenation and the lack of necessity of sterilization and aseptic techniques save considerable time. The dried thalli preparation is more stable than growing cells and the thalli may be recovered after completion of a 1,2-dehydrogenation reaction and be used over and over again.

In the usual growing cell fermentations for steriod dehydrogenation, serious side reactions usually take place which have been designated as "destructase" activity. With most steroids, destructase activity is widespread and results in a greatly decreased yield of the desired 1,2-dehydrogenated product, and with certain steroids destruction is so rapid and complete that no desired steroid can be isolated. Destructase activity is manifested by the simultaneous loss of 240 m$\mu$ absorption (due to the $\Delta^4$-3-ketone), and loss of blue tetrazolium reaction (due to the 20,21$\alpha$-ketol group), in those steroids which contain these groups. Thus the destructase system, at the very least, simultaneously attacks the "A" ring and "side chain," and the reactions involved may be considerably more profound. Growing cells of many 1,2-dehydrogenating organisms have been found to have a very active destructase system. It is unexpected and also unpredictable that the new method of utilizing dried thalli as described hereinbefore materially reduces the destructase activity or entirely removes such activity. Because of this fact, greatly increased yields of a wide variety of 1,2-dehydro steroids have been obtained with the organisms described hereinafter in the examples. The use of the new process significantly reduces the side reactions occurring in the usual fermentations of steriods to produce 1,2-dehydrogenation of such steroids.

The dried thalli preparation of the present invention can be prepared, for example, by taking 17 hour old cells of *Nocardia corallina* (ATCC 999) grown in a medium consisting of 0.25% sodium chloride, 0.4% peptone, 1% glucose, 0.4% beef extract, 0.1% yeast extract with pH adjusted to 7.0–7.2 before autoclaving, centrifugating clear of supernatant beer, washing once with water, centrifugating again and mixing the packed thalli with a small quantity of water to make a creamy paste. This paste is added dropwise to 10 volumes of cold acetone producing a flocculent precipitate. After filtering, the acetone prepared thalli are spread in a thin layer and air dried at room temperature. Alternatively, lyophilized thalli of *Nocardi corallina* can be prepared by, for example, a 6% 12 hour old inoculum of *Nocardia corallina* (ATCC 999) added to a 200 gallon stainless steel tank containing 400 liters of medium as described above. The inoculated medium is then agitated at about 130 r.p.m. Air is supplied at the rate of about 1 volume/volume/minute. It is also preferable to add Hodag oil as an anti-foaming agent in amounts to control the amount of foam. After 22 hours' growth at about 36° C. the mash is centrifugated in a Sharpless centrifuge. The resulting thalli paste is washed twice with 6 liters of 0.05 M Tris buffer pH 7.6. After a second wash the thalli are suspended in 8 liters of Tris buffer and lyophilized.

Among the steroids found useful in the process of the present invention are the following: hydrocortisone, testosterone, 19-nortestosterone and other cyclopentanopolyhydrophenanthrenes such as described hereinafter in the examples.

In using the dried thalli for the 1,2-dehydrogenation of steroids, the following procedure has been found desirable. A series of test tubes containing 10 ml. of reaction mixture are shaken at 20° C. on a reciprocating shaker. The reaction mixture consisting of 10 mg./ml. of dry thalli, and 200 µg./ml. of steroid added in from 0.1 ml. to 0.2 ml. of methanol diluted to 10 ml. with 0.05 M Tris buffer, pH 7.6. Aliquots of the reaction mixture containing the 200 µg. of steroid are removed at intervals for assay purposes. An 8-fold volume of water-saturated ethyl acetate is employed for extraction of the steroid. Aliquots of the solvent extract are used for colorimetric and paper chromatographic assay.

The following examples describe in detail the use of the dried thalli and the results obtained with representative steroids of the present invention.

*Example I*

A reaction mixture (I) consisting of 10 mg./ml. lyophilized thalli of *N. corallina* (ATCC 999) and 200 µg./ml. of hydrocortisone (F) diluted to 10 ml. with 0.05 M tris-(hydroxylmethyl)-aminomethane buffer pH 7.6 is prepared. A second reaction mixture (II) consisting of 10 ml. of 17 hour old *N. corallina* (ATCC 999) growing in Medium #13 (0.25% sodium chloride, 0.4% peptone, 1% glucose, 0.4% beef extract, 0.1% yeast extract) is prepared to which 200 µg./ml. of hydrocortisone (F) is added. Both reaction mixtures are placed in 100 ml. shaker tubes on a reciprocating shaker at 28° C. Aliquots of reaction mixture containing 100 µg. of steroid are removed periodically, extracted with 8 volumes of ethyl acetate and assayed.

The following results are obtained:

| Hours | I µg./100 µg. steroid | | II µg./100 µg. steroid | |
|---|---|---|---|---|
| | Δ¹F | F | Δ¹F | F |
| 1 | 68 | 54 | 65 | 27 |
| 3 | 110 | 8 | 89 | 3 |
| 6 | 116 | 0 | 47 | 0 |
| 21 | 120 | 0 | 7 | 0 |

*Example II*

It was found that acetone dried thalli showed the presence of a low order 1,2-dehydrogenase activity. Investigation has shown that addition of a suitable electron acceptor such as phenazine methosulfate (PMS) restores full activity to such a preparation. Furthermore, lyophilized thalli preparations which show considerable activity demonstrate enhanced activity in the presence of phenazine methosulfate. When using acetone-dried or lyophilized thalli of *N. corallina* prepared as described in the procedure above, to which 100 µg./ml. of phenazine methosulfate is added, the following results are obtained:

| Hrs. | Acetone Dried Thalli (1 mg./ml.) µg./100 µg. steroid | | Hrs. | Lyophilized Thalli (10 mg./ml.) µg./100 µg. steroid | |
|---|---|---|---|---|---|
| | Δ¹F | F | | Δ¹F | F |
| 2 | 67 | 23 | 1 | 99 | 14 |
| 5 | 80 | 13 | 3 | 100 | 10 |
| 24 | 87 | 4 | 7 | 98 | 10 |

*Example III*

A reaction mixture is prepared consisting of 10 mg. lyophilized *N. corallina* thalli, 100 µg. phenazine methosulfate, 200 µg. hydrocortisone diluted to 1 ml. with 0.05 M Tris buffer pH 7.6 and after one hour the reaction mixture is centrifuged and the supernatant decanted. The packed thalli are resuspended in fresh buffer containing steroid and phenazine methosulfate as above. The supernatant is extracted and assayed for content of prednisolone (Δ¹F) and hydrocortisone (F). This procedure is repeated using the same thalli seven times with the following results:

| Run | µg./100 µg. steroid | | Percent Δ¹F |
|---|---|---|---|
| | Δ¹F | F | |
| 1 | 83 | 4 | 95 |
| 2 | 55 | 7 | 89 |
| 3 | 57 | 33 | 63 |
| 4 | 45 | 45 | 50 |
| 5 | 36 | 75 | 32 |
| 6 | 32 | 83 | 28 |
| 7 | 89 | 63 | 58 |

All dehydrogenations recorded above occur after one hour of exposure of hydrocortisone to the reaction mixture except run 7 in which steroid is exposed to the reaction mixture for 16 hours. It is shown that extending the reaction beyond one hour permits complete dehydrogenation thru run 4 at least.

*Example IV*

The concentration of steroid useable in growing cell dehydrogenations rarely exceeds 200–250 µg./ml., the versatility and control which is readily afforded by dried thalli reactions permit significantly higher concentrations to be used. Using the general procedure described hereinbefore for lyophilized thalli of *N. corallina*, the following observations are made:

| Per ml. of reaction mixture | | | 24 hour assay, µg./100 µg. steroid | | Percent Δ¹F |
|---|---|---|---|---|---|
| Thalli (mg.) | PMS (µg.) | Hydro-cortisone (µg.) | Δ¹F | F | |
| 10 | 100 | 100 | 95 | 26 | 79 |
| | | 200 | 100 | 12 | 90 |
| | | 500 | 104 | 1 | 99 |
| | | 1,000 | 100 | 3 | 97 |
| | | 2,000 | 92 | 29 | 76 |
| 100 | 100 | 500 | 103 | 3 | 97 |
| | | 1,000 | 97 | 0 | 100 |
| | | 2,000 | 78 | 0 | 100 |
| | | 5,000 | 88 | 50 | 64 |
| | | 10,000 | 45 | 93 | 33 |
| 100 | 1,000 | 500 | 96 | 34 | 69 |
| | | 1,000 | 96 | 15 | 87 |
| | | 2,000 | 76 | 4 | 95 |
| | | 5,000 | 113 | 58 | 66 |
| | | 10,000 | 80 | 76 | 51 |

Example V

Using lyophilized thalli of *N. corallina* in the general procedure described hereinbefore, excellent yields are obtained of the 1,2-dehydro derivatives when using the following steroid substrates: 4-androsten-3,20-dione; 4-pregnene-3,20-dione; 17α,21 - dihydroxy-4-pregnene-3,20-dione; 11β,21-dihydroxy - 4 - pregnene-3,20-dione; 9α-fluoro-11β,21-dihydroxy - 4-pregnene-3,20-dione; 17α,21-dihydroxy-4-pregnene - 3,11,20 - trione; 11β,17α,21-trihydroxy-4-pregnene - 3,20-dione; 2α,fluoro-11β,17α,21-trihydroxy-4-pregnene - 3,20-dione; 9α-fluoro - 11β,17α,21-trihydroxy-4-pregnene-3,20-dione; 11β,16α,17α,21 - tetrahydroxy-4-pregnene-3,20-dione; 11β,17α,21 - trihydroxy-2α-methyl-4-pregnene - 3,20-dione; 9α-fluoro-6β,11β,17α,21-tetrahydroxy-4-pregnene-3,20 - dione; 9α-fluoro-11β,16α,17α,21-tetrahydroxy-4-pregnene-3,20-dione and 9α-fluoro-11β,21-dihydroxy - 16α,17α - isopropylidenedioxy-4-pregnene-3,20-dione.

Example VI

The following 1,2-dehydrogenating organisms, *Bacterium cyclooxydans*, *Bacterium mycoides*, *Nocardia aurantia*, *Corynebacterium simplex*, *Mycobacterium phlei*, *Pseudomonas testosteroni*, *Didymella lycopersici* and *Septomyxa affinis* are grown, washed and lyophilized in a manner similar to that described for *Nocardia corallina*. The lyophilized thalli preparations are then used to dehydrogenate hydrocortisone to prednisolone. All preparations carried out this reaction in high yields and showed a significant reduction in destructase activity relative to that observed with growing cell fermentations.

Example VII

In addition to an active 1,2-dehydrogenase, lyophilized *Nocardia corallina* thalli showed other enzymatic activities including 17-hydroxy oxidase (17-keto reductase) and esterase activity.

Using the protocol consisting of per ml.:10 mg. lyophilized *Nocardia corallina* thalli 200 μg./ml. steroid diluted to 1 ml. with 0.05 M Tris buffer pH 7.6, reaction is carried out with testosterone, 19-nortestosterone and 2α-hydroxytestosterone-2α,17β-diacetate. The following results are obtained:

| Testosterone, Hrs. | Testosterone, percent | $\Delta^1$-Testosterone, percent | Androstenedione percent | $\Delta^1$-Androstenedione, percent |
|---|---|---|---|---|
| 1 | 70 | 10 | 20 | |
| 6 | | | 40 | 60 |
| 21 | | | | 100 |

| 19-Nortestosterone, Hrs. | 19-Nortestosterone, percent | Estradiol, percent | 19-Norandrostenedione, percent | Estrone, percent |
|---|---|---|---|---|
| 1 | 85 | 10 | 5 | |
| 6 | | | 60 | 40 |
| 21 | | | | 100 |

2α-Hydroxytestosterone-2α,17β-diacetate (2αOHT-diAc)

| Hrs. | 2αOHT-diAc, percent | 2αOHT, percent | $\Delta^{1,2}$OHT, percent | 2αOH AD, percent | $\Delta^{1,2}$OH AD, percent |
|---|---|---|---|---|---|
| 1 | 20 | 10 | 5 | 55 | 10 |
| 6 | | | | 50 | 50 |
| 21 | | | | | 100 |

Formation of estradiol and estrone occurs due to aromatization of Δ¹-19-nortestosterone and Δ¹-19-norandrostenedione. Estrone is also formed by oxidation of the 17β-hydroxyl of estradiol to a 17-ketone.

We claim:

1. An improved aerobic process for the preparation of 3,17-disubstituted 1,2-dehydrogenated steroids which comprises contacting the corresponding 1,2-hydrogenated steroid with an aqueous suspension of dried thalli substantially free of spores in a proportion of not less than one part of dry weight of thalli to two parts of dried weight of steroid, said dried thalli having been prepared from a microorganism which 1,2-dehydrogenates steroids and which is selected from the group consisting of the classes Schizomycetes, Phycomycetes, Ascomycetes, Basidiomycetes and Fungi Imperfecti.

2. The process of claim 1 in which the microorganism is of the order Pseudomonadales and is *Pseudomonas testosteroni*.

3. The process of claim 1 in which the microorganism is of the order Eubacteriales and is *Bacterium cyclooxydaus*.

4. The process of claim 1 wherein the microorganism is of the order Actinomycetales and is *Nocardia corallina*.

5. The process of claim 1 in which the microorganism is of the family Bacteriaceae and is *Bacterium mycoides*.

6. The process of claim 1 in which the microorganism is of the family Corynebacteriaceae and is *Corynebacterium simplex*.

7. The process of claim 1 in which the microorganism is of the family Actinomycetaceae and is *Nocardia aurantia*.

8. The process of claim 1 in which the microorganism is of the family Mycobacteriaceae and is *Mycobacterium phlei*.

9. An improved process for the preparation of 1,2-dehydrogenated 3-substituted steroids of the pregnane series which comprises contacting the corresponding 1,2-hydrogenated steroid with an aqueous suspension of dried, powdered thalli substantially free of spores in a proportion of not less than one part of dried weight of thalli to two parts of dried weight of said steroid, said dried, powdered thalli having been prepared from a microorganism which 1,2-dehydrogenates steroids and which is selected from the genus Nocardia.

10. An improved process for the preparation of 1,2-dehydrogenated steroids having 18 to 21 carbon atoms and substituted in the 3-position which comprises contacting the corresponding 1,2-hydrogenated steroid with an aqueous suspension of dried, powdered thalli substantially free of spores in a proportion of not less than one part of dried weight of thalli to two parts of dried weight of said steroid, said dried, powdered thalli having been prepared from a microorganism which 1,2-dehydrogenates steroids and which is selected from the genus Nocardia.

11. An improved process for the preparation of Δ¹-hydrocortisone which comprises contacting hydrocortisone with an aqueous suspension of dried thalli substantially free of spores in a proportion of not less than one part of dried weight of thalli to two parts of dried weight of said hydrocortisone, said dried thalli having been prepared from *Nocardia corallina*.

12. An improved process for the preparation of estrone which comprises contacting 19-nortestosterone with an aqueous suspension of dried, powdered thalli substantially free of spores in a proportion of not less than one part of dry weight of thalli to two parts of dried 19-nortestosterone, said dried thalli having been prepared from *Nocardia corallina*.

13. An improved process for the preparation of Δ¹-hydrocortisone which comprises contacting hydrocortisone with an aqueous suspension of dried, powdered thalli substantially free of spores in a proportion of not less than one part of dried, powdered thalli to two parts of dried weight of steroid, said dried, powdered thalli having been prepared from *Nocardia corallina*, allowing the fermentation to proceed until a substantial amount of Δ¹-hydrocortisone is produced and recovering said Δ¹-hydrocortisone therefrom.

14. A method of preparing 3-substituted 17-keto Δ¹-steroids from the corresponding 17-hydroxyl-1,2-dihydrosteroids wihch comprises contacting said steroid with an aqueous suspension of dried, powdered thalli substantially free of spores in a proportion of not less than one part of dried, powdered thalli to two parts of dried weight of said steroid, said dried, powdered thalli having been prepared from a 1,2-dehydrogenated specie of the genus Nocardia.

15. A method of preparing $\Delta^1$-androstenedione which comprises contacting testosterone with an aqueous suspension of dried thalli substantially free of spores in a proportion of not less than one part of dried weight of thalli to two parts of dried weight of said testosterone, said dried thalli having been prepared from *Nocardia corallina*.

16. A method of preparing $\Delta^1$-2-hydroxyandrostenedione which comprises contacting 2α-hydroxy testosterone-2α,17α-diacetate with an aqueous suspension of dried thalli substantially free of spores in a proportion of not less than one part of dried weight of thalli to two parts of dried weight of said 2α-hydroxy testosterone-2α,17α-diacetate, said dried thalli having been prepared from *Nocardia corallina*.

17. An improved process for the hydrolysis of an ester group to a hydroxyl radical of a 3,17-disubstituted steroid ester which comprises contacting a said 3,17-disubstituted steroid ester with an aqueous suspension of dried thalli substantially free of spores in a proportion of not less than one part of dried weight of thalli to two parts of dried weight of said steroid ester, said dried thalli having been prepared from *Nocardia corallina*.

18. An improved process for the hydrolysis of a 3,17-disubstituted acetoxy steroid to the corresponding hydroxyl steroid which comprises contacting a 3,17-disubstituted acetoxy steroid with an aqueous suspension of dried thalli substantially free of spores in a proportion of not less than one part of dried weight of thalli to two parts of dried weight of said acetoxy steroid, said dried thalli having been prepared from *Nocardia corallina*.

19. An improved process for oxidizing a 17-hydroxyl steroid containing 18 to 19 carbon atoms to the corresponding 17-keto steroid which comprises contacting a 17-hydroxyl steroid with an aqueous suspension of dried thalli substantially free of spores in a proportion of not less than one part of dried weight of thalli to two parts of dried weight of said 17-hydroxyl steroid, said dried thalli having been prepared from *Nocardia corallina*.

References Cited in the file of this patent
UNITED STATES PATENTS

| | | |
|---|---|---|
| 2,880,205 | Campbell et al. | Mar. 31, 1959 |
| 2,958,631 | Charney | Nov. 1, 1960 |
| 3,016,335 | Stoudt | Jan. 9, 1962 |
| 3,031,379 | Knight | Apr. 24, 1962 |

UNITED STATES PATENT OFFICE
CERTIFICATE OF CORRECTION

Patent No. 3,087,864 April 30, 1963

Louis I. Feldman et al.

It is hereby certified that error appears in the above numbered patent requiring correction and that the said Letters Patent should read as corrected below.

In the heading to the printed specification, lines 2 and 3, for "PROCESS FOR THE 1,2-HYDROGENATION OF STEROIDS BY THE USE OF DRIED THALLI" read -- PROCESS FOR THE 1,2-DEHYDROGENATION OF STEROIDS BY THE USE OF DRIED THALLI --.

Signed and sealed this 26th day of November 1963.

(SEAL)
Attest:
ERNEST W. SWIDER

Attesting Officer

EDWIN L. REYNOLDS

Acting Commissioner of Patents